Figure 1:
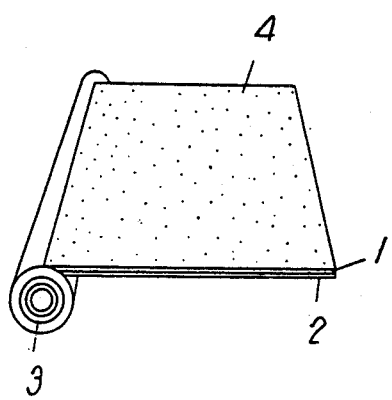

United States Patent [19]

Matsuda et al.

[11] 4,390,382
[45] Jun. 28, 1983

[54] TONE ARM MANUFACTURING METHOD

[75] Inventors: Shunsuke Matsuda, Osaka; Yasumasa Komatsu, Sakai, both of Japan

[73] Assignee: Matsushita Electric Industrial Co., Ltd., Osaka, Japan

[21] Appl. No.: 281,509

[22] Filed: Jul. 8, 1981

[30] Foreign Application Priority Data

Jul. 8, 1980 [JP] Japan ................................. 55-93649

[51] Int. Cl.³ ........................ B65H 81/00; G01B 3/10
[52] U.S. Cl. ........................................ 156/184; 264/258; 369/244; 428/36; 428/408
[58] Field of Search ............... 156/184, 187, 194, 245; 428/36, 408, 109, 110, 113; 264/257, 258, 108, 89.1; 369/244, 247, 158, 159; 138/174

[56] References Cited

U.S. PATENT DOCUMENTS 3,918,722 11/1975 Nakajima et al. ................... 369/247
4,261,580 4/1981 Tsukagoshi et al. ................ 264/108
4,269,416 5/1981 Toshino et al. ..................... 264/108

*Primary Examiner*—Michael W. Ball
*Attorney, Agent, or Firm*—Wenderoth, Lind & Ponack

[57] ABSTRACT

Method of manufacturing a tone arm by superposing a sheet of graphite flakes bound with resin, on a carbon fiber prepreg, winding the resultant double layer product around a core, heat-hardening the resultant assembly, and removing the core to form a pipe-shaped tone arm.

4 Claims, 2 Drawing Figures

TONE ARM MANUFACTURING METHOD

This invention relates to a method for manufacturing a tone arm for supporting a pickup cartridge used for a record player.

Conventionally, a tone arm has been formed of a light alloy, such as aluminum, titanium or magnesium, and other light materials moldable into pipes, e.g., a carbon fiber resin composite.

A tone arm is required to be light in weight, have a proper rigidity necessary to support the pickup cartridge, generate no unnecessary resonance, absorb useless vibrations, and have a shielding effect with respect to signal wires passing through the pipe.

With respect to these necessary characteristics, the light alloy mentioned above has the necessary rigidity and a moderate manufacturing cost, but its logarithmic decrement is small and therefor the tone arm does not improve the S/N ratio by absorbing useless vibrations.

A carbon fiber tone arm recently in use is superior in rigidity, light in weight, and has a large logarithmic decrement, but has a large anisotropy in the rigidity. In order to overcome such defect, the fiber should be wound not only in the direction perpendicular to the direction of the yarn but also obliquly, resulting in a tone arm which is expensive to produce due to a high cost of material and a complicated process.

Characteristics of the above three materials are shown in the following table, in which the above desirous characteristics are so represented that the rigidity is shown by a Young's modulus (E), lightweight property by density ($\rho$) and absorption capacity of useless vibrations by an internal loss (tan $\delta$).

|  | $E(N/m^2)$ | $\rho$ (g/cc) | tan $\delta$ |
| --- | --- | --- | --- |
| Aluminum | $7.0 \times 10^{10}$ | 2.7 | 0.002 |
| Titanium | $11.9 \times 10^{10}$ | 4.4 | 0.002 |
| Carbon Fiber Resin Composite | $7.8 \times 10^{10}$ (In Fiber Direction) | 1.6 | 0.02 |
|  | $0.6 \times 10^{10}$ (Perpendicular to Fiber) | 1.6 | 0.04 |

As seen from the above table, characteristics of aluminum and titanium are isotropic, but that of carbon fiber composite, especially the rigidity, is ten times different. The rigidity in the direction perpendicular to the yarn is almost equal to that of the parent material resin, so that the carbon fiber composite is said not to be effective.

In view of the characteristics of the conventional materials, this invention has been designed to provide a method of manufacturing a tone arm which is balanced in characteristics like E, $\rho$ and tan $\delta$ better than the aforesaid light metal or carbon fiber composite.

This invention is directed to manufacturing a tone arm in such a manner that on a carbon fiber prepreg, for example, of about 50 $\mu$m, there is lapped a graphite flake layered sheet (50 to 100 $\mu$m thick), which is wound around a core and pressed and heated to be hardened, and thereafter the core is removed to obtain a pipe-shaped tone arm.

Figure 2:
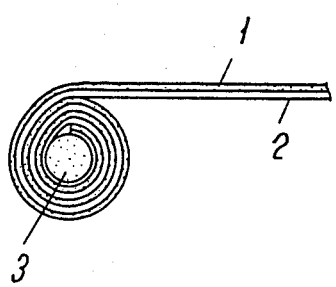

Hereinafter, this invention will be detailedly described with the aid of FIGS. 1 and 2 are views explanatory of an embodiment of the invention, showing the principal portion thereof.

The carbon fiber resin composite prepreg may be a marketed article such as PIROFIRU or TOREKA (commercial name), by Mitsubishi Rayon Co., Ltd. or Toray Industries, Inc., which arranges carbon fiber yarn in rows one by one in the fixed direction and mostly has a carbon fiber content of 60% and the rest of resin.

On the other hand, the graphite flake layered sheet is produced in such a manner that graphite and thermosetting resin are kneaded to form a mixture which is applied on a polyester sheet by use of a roller so that graphite flakes are rolled to be disposed face to face on the sheet. The sheet, when applied with a mold release process, can use most films, e.g., polypropylene, paper, polystyrene, polyvinylidene fluoride, Kapton, polysulfone, or polycarbonate.

A suitable mixing ratio of graphite flakes and resin is in a range of about 6:4 to 8:2 in weight percentage. When more resin is used the composite coils around the roll so as not to easily stick to a film. When less resin is used, the composite does not stick to both the roll and film so as to be plate-like shaped. Also, when graphite flake is smaller in particle size, the composite is not well stuck unless the mixing ratio of resin is raised.

Graphite in use is preferably flaky. CSP, CSPE offered by Nippon Kokuen Kogyo Co., Ltd., even smaller in particle size, and F #1, F #2, or CB-150, offered by the same company, even larger in particle size, are available. Graphite represents a large internal loss as a result of sliding between molecules, whereby the particles of a large aspect ratio are used to be applied on the film so that flakes are layered and bound tight so as not to produce a space at the interface of graphite particle and resin. For this, a titanium coupling agent is used.

Resin is preferred to be hardened in the same condition as used for the carbon fiber composite prepreg, thereby achieving a good result by use of the same resin. The prepreg often uses epoxy resin, especially using $BF_3$ complex as a hardening agent, which has a very long gelling time and is well preserved.

The carbon fiber prepreg and graphite layered sheet each are cut, for easy winding, into a rectangular, trapezoid, or fan-like shape corresponding to the shape of the pipe and are wound in layers around a core of a steel rod or pipe.

Upon completing the winding, tape is tightly wound on the outer periphery and the assembly is heated, so that the core is heat-expanded to press the wound material, thereby promoting the hardening under pressure. After hardening, the tape is removed and the core is drawn out to obtain a tone arm of a pipe-like shape.

FIG. 1 is a perspective view of winding material 4 showing a start of winding, in which 1 is the carbon fiber prepreg, 2 is a graphite flake layered sheet, and 3 is a steel core, the core 3 being slightly tapered in the lengthwise direction. Material 4 is trapezoid-shaped. If the core were not tapered, material 4 would be rectangular in shape.

At first, surface of core 3 is applied with a mold releasing agent, and then with an adhesive. The end of material 4 is stuck to core 3 and tightly wound threon, as shown in FIG. 2. In addition, graphite flake layered sheet 2 may be positioned inside and carbon fiber prepreg 1 outside, or vice versa, which is not essential but merely concerns a quality of appearance.

The hardening temperature depends upon the resin used in the prepreg and layered sheet, the usual resin being hardened at 120° to 170° C.

After the hardening, core 3 is removed to form a pipe-shaped material, the material being polished and painted at the surface to complete the tone arm.

The graphite layered sheet, which is heated and hardened under pressure, has a very high rigidity and is light in weight, and its internal loss is higher. For example, a composite comprising seven parts by weight of graphite and three parts by weight of resin has the following properties:

E: $5.8 \times 10^{10}$ N/m$^2$
$\rho$: 1.6 g/cc
tan $\delta$: 0.03

Therefore, the graphite layered sheet compensates the anisotropy of rigidity, especially a radial weakness in the rigidity, of the carbon fiber composite, and the carbon fiber makes the lengthwise rigidity higher than that of the graphite layered sheet, thus resulting in well balanced high rigidity.

The internal loss increases due to existence of graphite. Hence, characteristics, when a sheet of 50 μm in thickness is wound in layers, are shown as follows:

E: in Fiber direction $6.5 \times 10^{10}$ N/m$^2$
Perpendicular to fiber, $4 \times 10^{10}$ N/m$^2$
$\rho$: 1.6 g/cc
tan $\delta$: in Fiber direction, 0.03
Perpendicular to fiber, 0.03

As seen from the above, the tone arm of the invention has the following advantages:

(1) It is lightweight, having a high rigidity, and being higher in internal loss in comparison with a tone arm made from a light alloy, such as aluminum or titanium.

(2) It is isotropic and of a greater rigidity with respect to every direction in comparison with a tone arm made from a carbon fiber complex.

(3) It has a low manufacturing cost due to a reduction in the amount of expensive carbon fiber used (the present price of carbon fiber is about ten times that of graphite).

What is claimed is:

1. A method of manufacturing a tone arm, comprising:
   preparing a carbon fiber prepreg;
   preparing a sheet containing graphite flake particles bound with resin in such a manner that said flake particles are layered face to face, said resin being heat-hardenable under conditions similar to those for said carbon fiber prepreg;
   placing said carbon fiber prepreg on said sheet to form a double layer;
   winding said double layer on a core so as to form a cylindrical layered assembly on said core;
   heat-hardening said cylindrical layered assembly; and
   removing said core from said assembly, thereby forming a pipe-shaped tone arm.

2. A method according to claim 1, wherein said carbon fiber prepreg is about 500 μm in thickness, and said sheet is 50 to 100 μm in thickness.

3. A method according to claim 1, wherein the weight ratio of said graphite flakes to said resin in said sheet is in the range from about 6:4 to 8:2.

4. A method according to claim 1, wherein said heat-hardening is conducted at 120° to 170° C.

* * * * *